UNITED STATES PATENT OFFICE.

MAX LAMBECK, OF BARMEN, GERMANY.

PROCESS FOR MAKING THE COLORING OF NATURAL HORN WATER-RESISTING.

1,395,191.  Specification of Letters Patent.  Patented Oct. 25, 1921.

No Drawing.  Application filed August 12, 1921. Serial No. 491,879.

*To all whom it may concern:*

Be it known that I, MAX LAMBECK, a citizen of Germany, residing at 18 Flötenstrasse, Barmen, Germany, have invented certain new and useful Improvements in Processes for Making the Coloring of Natural Horn Water-Resisting, (for which I have filed an application in Germany, Sept. 26, 1919,) of which the following is a specification.

Natural horn possesses a number of valuable properties which make it particularly suitable for working into walking stick handles, knife handles, door handles, buttons, combs and other articles. A disadvantage of natural horn however is that its coloring becomes dull under the influence of water, while it is hardly possible to prevent articles made of horn getting damp through rain or from other causes.

The present process is based upon the discovery that by the action of formaldehyde, upon the natural horn its natural coloring remains completely unaltered, while at the same time those constituents of the natural horn which become dull under the influence of water, or otherwise change, are rendered now sensitive to water, dampness or other atmospheric influence. It is particularly to be noted that the formaldehyde acts especially upon articles which are worked across the grain or fibers of the horn, while it is these articles which are particularly liable to be changed by contact with water.

The process is carried out by exposing the completed articles of horn, to the action of formaldehyde. Either the ordinary commercial concentration (35–40%) can be employed, or lower or higher concentrations. Alcoholic or other solutions of the formaldehyde can be employed, as well as formaldehyde in the form of vapor or gas. The polymers can also be used, as well as substances which give up formaldehyde, e. g., hexamethylenetetramin.

The process is applicable to all articles which are made of natural horn. A condition for carrying out the process is that the organized structure of the natural horn is still present. Apart from this however the process can be applied to articles which are made from pieces of horn or horn scrap by pressing. The material here employed still contains the original structure of the horn so that it is not a separate substance isolated from the horn which is employed for making up the articles.

A further result of the process is that the articles are not only rendered water-resisting but are made more resisting generally and the mechanical disturbance or disruption which gradually takes place owing to the action of water upon natural horn is prevented or is retarded.

The duration of the operation of the formaldehyde depends upon the size and other qualities of the horn to be treated. Generally it is sufficient to immerse the articles for one to two days in an aqueous solution of formaldehyde. The process can however be applied for a longer or shorter time.

I claim:—

Process for making the coloring of natural horn water-resisting, which consists in exposing articles of natural horn to the action of formaldehyde.

In testimony whereof I hereunto affix my signature.

MAX LAMBECK.